Nov. 30, 1943. M. BERZER 2,335,256
AUTOMOBILE SAFETY DEVICE
Filed Jan. 10, 1942
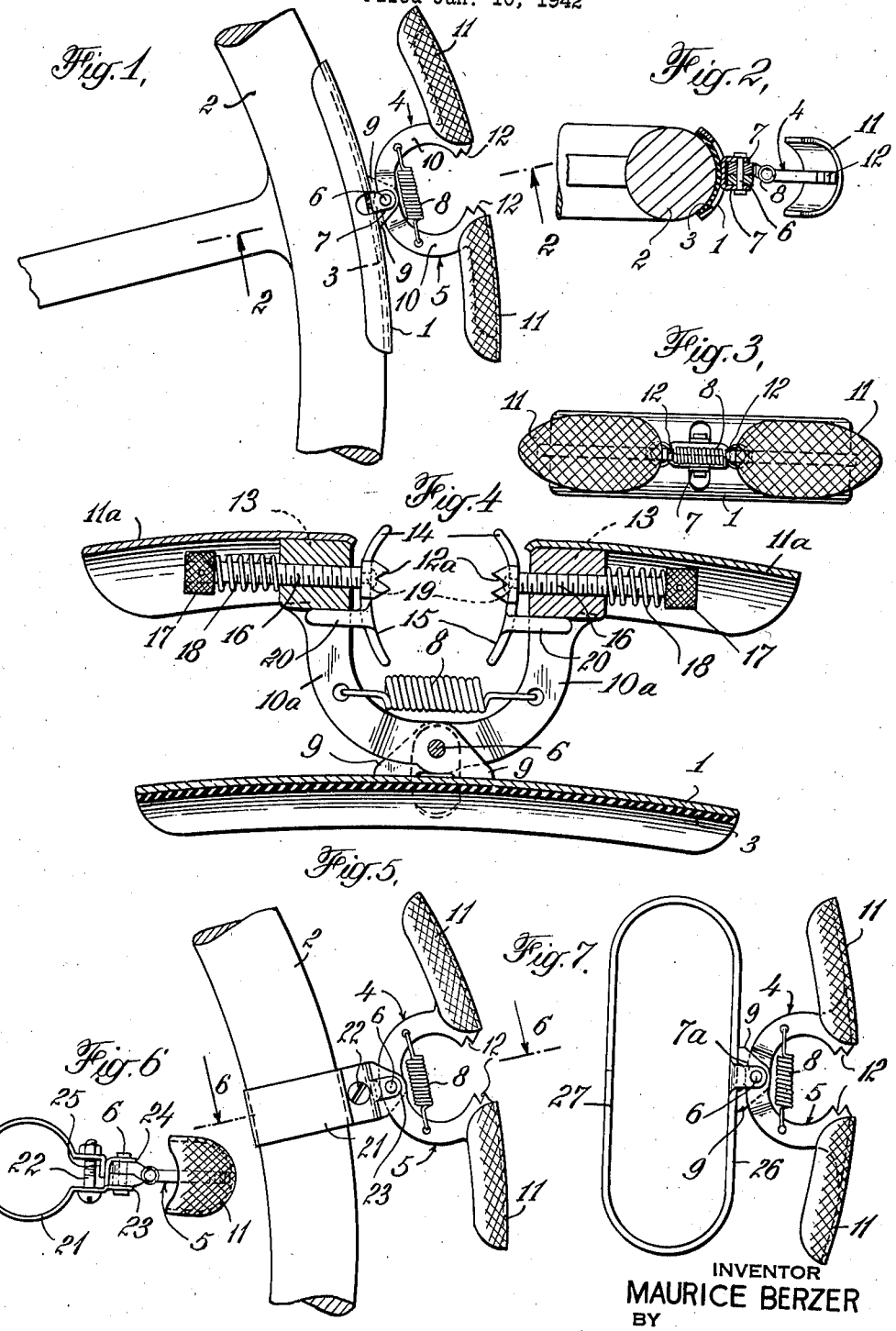
INVENTOR
MAURICE BERZER
BY
Pennie, Davis, Marvin & Edmonds
ATTORNEY Patented Nov. 30, 1943

2,335,256

UNITED STATES PATENT OFFICE 2,335,256

AUTOMOBILE SAFETY DEVICE

Maurice Berzer, Atlantic Beach, N. Y.

Application January 10, 1942, Serial No. 426,363

4 Claims. (Cl. 116—28)

This invention relates to safety devices for the prevention of drowsiness, and more particularly to mechanical devices for restraining the tendency to become sleepy or drowsy which sometimes attacks persons through fatigue or otherwise. The general object of the invention is the provision of an improved device for this purpose.

It is well known that when driving vehicles of various kinds, such, for example, as motor cars, particularly on long, straight stretches where there is little traffic, and not much effort is required of the driver in operating the vehicle, that if the driver is somewhat fatigued, there may be at times a tendency to become drowsy and momentarily to lose control of the car. This difficulty has been experienced by the motormen of electric trains and by truck drivers, particularly those who have been on duty continuously for a long time.

Numerous attempts have been made to improve the safety of operation of trains and motor cars under these conditions, but the proposals made heretofore have included complicated apparatus usually having to do with the control of the vehicle through the application of the vehicle brakes or the shutting off of the propelling power, or both. The complicated nature of these previous mechanisms has made them expensive, and also required that they be built into the particular vehicle.

The present invention aims, on the other hand, to provide a device of great simplicity which operates not on the vehicle but upon the driver to restrain the attack of drowsiness and prevent the actual loss of consciousness.

More especially, the object of the present invention is to provide a device which is capable of producing physical discomfort to the person undergoing the attack of drowsiness and also providing for the prevention of the application of the discomfort-producing force through muscular activity so that if the muscular activity tends to be relaxed, the discomfort will be produced, thus arousing the person.

The invention will be understood from a consideration of the accompanying drawing which illustrates, by way of example, several modifications of the device.

Referring now to the accompanying drawing:

Fig. 1 is a side view of the device in the position in which it may be held by hand on the rim of a motor vehicle steering wheel;

Fig. 2 is a transverse sectional view taken on line 2—2 of Fig. 1;

Fig. 3 is a view of the device looking from the right of Fig. 1 at the steering wheel;

Fig. 4 is a longitudinal sectional view of a modification showing an adjustable device;

Fig. 5 is a view similar to Fig. 1 of another modification;

Fig. 6 is a transverse sectional view taken on line 6—6 of Fig. 5; and

Fig. 7 is a view similar to Fig. 1 of a further modification which is used independently of any other object.

Referring now to the accompanying drawing, and first to Figs. 1, 2 and 3, the improved safety device comprises a base or mounting member 1, preferably of metal, curved both laterally and longitudinally as shown in Figs. 1 and 2 so as to approximately conform to the surface of the rim of a motor vehicle steering wheel 2. It is desirable to provide on the mounting member 1 a cover 3, particularly on its concave surface, for a purpose which will hereafter appear.

Pivotally mounted upon the member 1 are two cooperating finger-pinching members 4 and 5. These members are pivoted on a common pivot pin 6 which extends through apertures in the finger-pinching members and is anchored in a pair of lugs 7 preferably struck up from the metal of mounting member 1.

The finger-pinching arms 4 and 5 are biased toward one another by means of a helical spring 8 connected at its opposite ends to these members outwardly from pivot 6. Spring 8 normally holds foot portions 9 formed on each of the finger-pinching members adjacent pivot 6 in contact with the outer surface of mounting member 1, these feet thus forming stops for limiting the movement of the finger-pinching members under the action of spring 8.

Each of the finger-pinching members 4 and 5 is provided with a finger-encircling portion 10 extending outwardly from pivot 6 and with a handle or gripping portion 11 extending at right angles thereto. Adjacent their outer ends each of the finger-encircling portions 10 is provided with finger-pinching surfaces or elements 12, shown in the form of a pair of teeth in the embodiment of the invention illustrated in the drawing, and adapted to be pressed against the opposite sides of a finger of the hand of the vehicle driver by the force exerted by helical spring 8. By pressing inwardly on the handle portions 11 by two adjacent fingers, however, the pinching pressure of the tooth portions 12 against the sides of the finger clamped between them can be relieved so that no discomfort is felt.

The device shown in Figs. 1, 2 and 3 is not permanently mounted upon the steering wheel, but may be carried in some convenient place—for example, in the glove compartment in the car, and removed therefrom whenever the driver feels the need of its aid in keeping himself awake. The device may be used on either hand and any convenient finger, for example, the second finger is placed within the curved opening formed by the finger-pinching portions 10 and with the pinching portions or teeth 12 against the outer portions of the finger. The inner surfaces of the first and third fingers are applied outside the handle portions 11, the pressure of the thumb on the inside of the base 1 being used to prevent too great a pinching action upon the second finger while the device is being applied against the surface of the rim of the steering wheel 2.

The curvature of member 1 is such that the device may be easily held against the wheel in any position which is comfortable for the particular driver and the pressure of the first and third fingers on the handle portions 11, the reaction of which is taken by the pressure of member 1 against the surface of the steering wheel, relieves the pinching pressure of the tooth portions 12 against the sides of the second finger. If, however, the driver should, through drowsiness or otherwise, slightly relax the pressure of the first and third fingers on the handle portions of the device, the pinching action on the second finger immediately takes place under the force of biasing spring 8 and instantly arouses the driver.

The desire to use such a device is usually felt when driving under conditions where little driving effort is required, such, for example, as when driving along a straight isolated road. In such a case the steering wheel does not have to be shifted to any great extent in either direction so that the hands usually remain for long periods of time in the same position on the wheel. If it should be necessary, however, to shift the positions of the hands on the wheel, or in other words, to "climb" the wheel, the safety device lends itself to easy shifting in either direction. The base member 1 is merely slid along the outer surface of the steering wheel rim and the rubber, or other friction surface on the interior of member 1, aids in getting the new grip on the wheel in a different position.

It is apparent that the size of the opening between the finger-encircling portions 10 and the space between the finger-pinching portions 12 must fit approximately the size of the finger of the user. This is taken care of within fairly considerable limits through the normal variation in diameter of the fingers, the particular user placing the device on a portion of his finger which it most conveniently fits. In Fig. 4, however, there is shown a modification which is adjustable not only for different finger sizes, but also to vary the pinching pressure exerted by the biasing spring. Aside from this adjustable feature this device is like the one above described.

Referring now to Fig. 4, the finger-encircling portions 10a terminate outwardly in short thickened end portions 13 to which the handle portions 11a may be secured in any desirable manner, as, for example, by welding, soldering or riveting. The finger-pinching portions 12a, instead of being integral with the finger-encircling portions as in the previously described construction, are adjustable laterally thereon. They are also provided with upper and lower guard portions 14 and 15 which serve to hold the finger-pinching teeth 12a in contact with the sides of the finger. The guard portions 14 and 15 are preferably formed integrally with the other portions 12a and are carried on the outer end of an adjusting screw 16 which is threaded through the end portion 13 and provided with a knurled handle 17 at its outer end and with a helical spring 18 to provide friction so as to hold the parts in any position to which they may be adjusted. The outer end of screw 16 is swiveled, as indicated in dotted lines at 19 within a recess at the back of tooth portion 12a. In order to prevent the tooth portion 12a and its guards 14 and 15 from rotating when screw 16 is turned, guide fingers 20 are arranged to slide on each side of the finger-encircling portion 10a.

Referring now to Figs. 5 and 6, there is here shown a modification which is similar in all respects to the device of Figs. 1, 2 and 3 except that instead of having a mounting member which is free from the steering wheel, the device is permanently attached to the rim 2 of the steering wheel by means of a clamp 21. This clamp comprises a narrow metal band which surrounds the rim 2 and is held in clamped position by means of a small bolt 22.

On one end of the strip forming the clamp, lugs 23 and 24, corresponding to lug 7 of Fig. 1, are formed. The pivot pin 6 extends between these lugs to support the pinching members 4 and 5. One of the lugs 24, as shown in Fig. 6, has a portion which is parallel with the clamping bolt 22 and the opposite end of the strip forming clamp 21 is provided with an inturned portion 25 which slides parallel and preferably in contact with portion 25 as the nut of the clamping bolt 22 is tightened.

While the device has been described particularly for use as a safety device in connection with the operation of motor vehicles, it is also capable of use at other times, for example, when attending a lecture which one desires to hear but to which he finds it difficult to pay attention because of drowsiness. Also it might be found useful by soldiers on sentry duty and by the cavalry. A modification of the safety device which is adapted for such general use is illustrated in Fig. 7. Here the mounting or base member 26 is shaped to fit the palm of the hand, and while it may be made in many different forms, as shown it is constructed of a metal band or ribbon which is bent to form a flattened, elongated figure having a more or less straight portion 27 adapted to rest on the palm to take the reaction of the pressure of the fingers against the handle portions 11. The lugs 7a which support the pinching members 4 and 5 are bent outwardly from the sides of base member 26, as shown.

By means of my invention there has been provided a simple, inexpensive device which is useful to restrain drowsiness by demanding the constant attention of the user under the penalty of severe physical discomfort. The device is capable of production at small cost and constitutes a safety device which can be available for wide use.

I claim:

1. A device for restraining drowsiness comprising a mounting member adapted to be held in the hand, a pair of finger-pinching members pivoted on said mounting member and biased to pinching position and means adapted to be engaged by adjacent fingers for holding said finger-pinching members out of pinching position.

2. In a motor vehicle safety device, the combination with a steering wheel for the vehicle of a device for restraining drowsiness comprising a mounting member, a pair of finger-pinching members pivoted thereon and biased to pinching position and handle means movable to hold said finger-pinching members out of pinching position and arranged to be engaged by adjacent fingers of the vehicle operator's hand, said mounting member having a surface shaped to cooperate with the surface of the steering wheel rim whereby the device can be held in operative position and slid along the surface of said rim when it is necessary to shift the gripping position on the wheel in steering.

3. A device for restraining drowsiness comprising a mounting member, a pair of finger-encircling members pivoted thereon and having handle portions extending in opposite directions, a finger-pinching element carried by each of said members, a spring for biasing said members toward one another to exert a pinching action upon a finger of the user's hand, said pinching action being controlled by the pressure of adjacent fingers on said handle members, and means for adjusting the degree of pinching action applied by said spring.

4. A device for restraining drowsiness comprising a mounting member, a pair of finger-encircling members pivoted thereon and having handle portions extending in opposite directions, a finger-pinching element carried by each of said members, a spring for biasing said members toward one another to exert a pinching action upon a finger of the user's hand, said pinching action being controlled by the pressure of adjacent fingers on said handle members, each of said finger-pinching members being slidable on its supporting member and having an adjusting screw, whereby said finger-pinching members can be adjusted with respect to one another.

MAURICE BERZER.